(12) United States Patent
Morozumi

(10) Patent No.: US 7,519,760 B2
(45) Date of Patent: Apr. 14, 2009

(54) DATA PROCESSING METHOD AND SYSTEM FOR INPUTTING DATA TO PIECES OF DIGITAL EQUIPMENT

(75) Inventor: Hideki Morozumi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 356 days.

(21) Appl. No.: 10/821,571

(22) Filed: Apr. 9, 2004

(65) Prior Publication Data

US 2005/0009468 A1     Jan. 13, 2005

(30) Foreign Application Priority Data

Apr. 10, 2003   (JP)   ............................ P2003-106594

(51) Int. Cl.
*G06F 13/20* (2006.01)
(52) U.S. Cl. ........................... 710/313; 710/10; 710/16; 710/316; 348/211.5
(58) Field of Classification Search ......... 710/300–317, 710/8–19, 35–38, 62–64, 72; 348/211.3–211.5, 348/333.01, 333.12
See application file for complete search history.

(56) References Cited

U.S. PATENT DOCUMENTS

| 6,006,039 | A  | * | 12/1999 | Steinberg et al. | ............... | 396/57 |
| 6,104,886 | A  | * | 8/2000  | Suzuki et al.    | ............... | 396/429 |
| 6,263,392 | B1 | * | 7/2001  | McCauley         | .................. | 710/305 |
| 6,308,239 | B1 | * | 10/2001 | Osakada et al.   | ............. | 710/316 |
| 6,732,218 | B2 | * | 5/2004  | Overtoom et al.  | ........... | 710/313 |
| 6,774,935 | B1 | * | 8/2004  | Morimoto et al.  | ........ | 348/211.5 |
| 6,963,933 | B2 | * | 11/2005 | Saito et al.     | ...................... | 710/1 |
| 7,113,218 | B2 | * | 9/2006  | Battles et al.   | ............... | 348/373 |
| 7,200,685 | B2 | * | 4/2007  | Uemura           | ......................... | 710/2 |
| 2004/0017772 | A1 | * | 1/2004 | Saito et al.    | .................. | 370/229 |
| 2004/0073697 | A1 | * | 4/2004 | Saito et al.    | .................. | 709/233 |
| 2004/0088465 | A1 | * | 5/2004 | Bianchi         | ...................... | 710/303 |

(Continued)

FOREIGN PATENT DOCUMENTS

JP   2000-194645   7/2000

(Continued)

OTHER PUBLICATIONS

Abstract of Japanese Patent Publication No. 2001-238156, Pub. Date: Aug. 31, 2001, Patent Abstracts of Japan.

(Continued)

*Primary Examiner*—Raymond N Phan
(74) *Attorney, Agent, or Firm*—Martine Penilla & Gencarella, LLP

(57) ABSTRACT

A first device is provided with a communicator having a first interface function and a second interface function defined in an asymmetric interface standard. A second device is connected to the first device. The first device detects whether the second device has at least one of the first interface function and the second interface function. Data is transmitted from the first device to the second device, through use of the first interface function, in a case where it is detected that the second device has the second interface function. A signal for processing the data is transmitted from the first device to the second device, through use of the second interface function, in a case where it is detected that the second device has the first interface function.

10 Claims, 9 Drawing Sheets

U.S. PATENT DOCUMENTS

| | | | |
|---|---|---|---|
| 2004/0103163 A1* | 5/2004 | Lin et al. | 709/211 |
| 2004/0189808 A1* | 9/2004 | Tanaka | 348/207.1 |
| 2005/0185205 A1* | 8/2005 | Eckhaus et al. | 358/1.13 |

FOREIGN PATENT DOCUMENTS

| | | |
|---|---|---|
| JP | 2001-238156 | 8/2001 |
| JP | 2002-116853 | 4/2002 |
| JP | 2002-252798 | 9/2002 |
| JP | 2002-271721 | 9/2002 |
| JP | 2002-305677 | 10/2002 |

OTHER PUBLICATIONS

English Abstract of Japanese Patent Publication No. 2002-305677, Pub. Date: Oct. 18, 2002, Patent Abstracts of Japan.

USB Device Working Group, Website content entitled "Universal Serial Bus Still Image Capture Device Definition," Revision 1.0, Jul. 11, 2000, retrieved from the Internet on Jun. 6, 2006 (URL: http://www.usb.org/developers/devclass_docs/usb_still_img10.pdf).

Abstract of Japanese Patent Publication No. 2000-194645, Pub. Date: Jul. 14, 2000, Patent Abstracts of Japan.

Abstract of Japanese Patent Publication No. 2002-116853, Pub. Date: Apr. 19, 2002, Patent Abstracts of Japan.

Abstract of Japanese Patent Publication No. 2002-252798, Pub. Date: Sep. 6, 2002, Patent Abstracts of Japan.

Abstract of Japanese Patent Publication No. 2002-271721, Pub. Date: Sep. 20, 2002, Patent Abstracts of Japan.

* cited by examiner

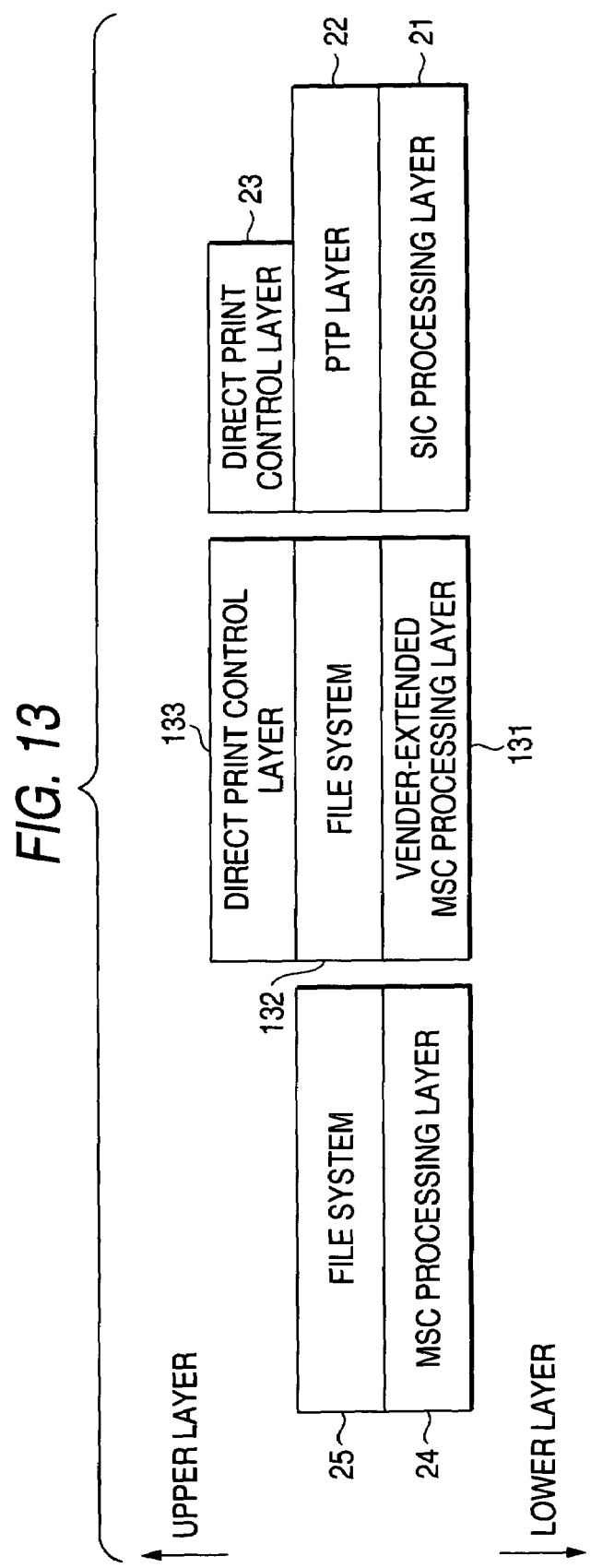

DATA PROCESSING METHOD AND SYSTEM FOR INPUTTING DATA TO PIECES OF DIGITAL EQUIPMENT

BACKGROUND OF THE INVENTION

The present invention relates to a data input device which has an interface circuit to be connected to digital equipment and inputs data to the digital equipment. The present invention also relates to a data input method and an image output system using such a data input device.

A digital camera device photographs a subject and stores image data pertaining to the subject in a built-in recording medium as a data file. When the data file of the image data is fetched, terminal equipment, such as a personal computer, is connected to a digital camera device. The data file of the image data stored in the digital camera device is transferred to the terminal equipment (see, e.g., Japanese Patent Publication No. 2001-238156A). In this context, the digital camera device can be regarded as a data input device which has an interface circuit connected to another piece of digital equipment (i.e., terminal equipment) and inputs data to the equipment.

There has recently been developed a so-called direct print system, wherein a digital camera device is connected directly to a printer, and images captured by the digital camera device are printed without use of a personal computer or the like. The direct print system can be regarded as a kind of image output system, and direct print systems can be categorized into a system for transferring an image data file of a JPEG (Joint Picture Experts Group) format, and a system for generating a print control command, such as an ESC/P (Epson Standard Code for Printer), from image data through use of a digital camera device and transferring the print control command to a printer.

A USB (Universal Serial Bus) or the like is frequently used as an interface between such a digital camera device, the terminal equipment, and the printer. According to the USB standards, a first interface circuit of two pieces of mutually-connected equipment is taken as a device, and the other piece of equipment; that is, a second interface circuit, is taken as a host. Specifically, the USB standards are interface standards for imparting different roles to the interface circuits of the two pieces of mutually-connected equipment.

Recently, On-the-Go standards have been designated in connection with the USB standards. According to the On-The-Go standards, two functions; that is, an interface function of the host and that of a device, are implemented on one device. Either the interface function of the host or that of the device is used, as required.

As mentioned above, various pieces of digital equipment having interface circuits of identical interface standards are often connected to the digital camera device serving as a data input device. Therefore, by way of a physical cable, digital equipment can be connected to the digital camera device.

However, compatibility between vendors cannot be achieved by an application which is higher in level than the interface (e.g., the USB) interconnecting pieces of equipment, and, even within the range of compatible vendors, in some cases compatibility is not achieved, depending on the type of equipment. Although a data input device can be physically connected to another piece of digital equipment, the user cannot use the data input device and another digital equipment in conjunction with each other, thereby posing inconvenience to the user.

Currently, for instance, the above-described direct print system frequently uses a USB as an interface. However, there are many cases where a communication scheme, which is higher in level than the USB, and an application are frequently prepared to specifications that are unique to the vendor. Moreover, as a result of emergence of the On-The-Go standards of the USB, this situation is considered to become more noticeable.

SUMMARY OF THE INVENTION

It is therefore an object of the invention to provide a data input method for inputting appropriate data to a larger number of pieces of digital equipment by way of a data input device.

It is also an object of the invention to provide a data input device capable of working in conjunction with a larger number of pieces of digital equipment, and an image output system using such a data input device.

In order to achieve the above objects, according to the invention, there is provided a data processing method, comprising steps of:

providing a first device comprising a communicator having a first interface function and a second interface function defined in an asymmetric interface standard;

connecting a second device to the first device;

detecting whether the second device has at least one of the first interface function and the second interface function;

transmitting data, from the first device to the second device, through use of the first interface function, in a case where it is detected that the second device has the second interface function; and transmitting a signal for processing the data, from the first device to the second device, through use of the second interface function, in a case where it is detected that the second device has the first interface function.

In such a configuration, the first device can work in conjunction with a larger number of devices which can be physically connected to the first device. Therefore, there can be diminished occurrence of a problem for the user, such as a problem of the second device being incapable of being utilized by way of the first device though the second device can be physically connected to the first device.

Preferably, the data includes at least one of image data, music data and motion picture data.

Preferably, it is detected that the second device has the first interface function in a case where a first type connector of a cable defined under the interface standard is connected to the communicator; and it is detected that the second device has the second interface function in a case where a second type connector of a cable defined under the interface standard is connected to the communicator.

In such a configuration, the type of communications processing required by the first device (i.e., processing involving use of the first interface circuit or processing involving use of the second interface circuit) can be readily identified.

Preferably, each of the steps of transmitting the data and the signal is performed on the basis of one of a plurality of USB classes in accordance with at least one of a type of the second device and an application executed in the second device. The data may include a data file and attribute information of the data file such as a file format, a file volume and file list information).

In such a configuration, even when various USB classes are used by the second device to be connected to the first device, the first device can work in conjunction with a larger number of pieces of devices that can be physically connected with the first device.

Preferably, the interface standard is an On-The-Go standard of a USB. The first interface function is a device-side interface function of the USB, and the second interface function is a host-side interface function of the USB.

In such a configuration, the first device can work in conjunction with a larger number of devices. Therefore, there can be diminished occurrence of a problem for the user, such as a problem of difficulty being encountered when a first device fails to utilize second device although the second device can be physically connected to the first device.

Here, it is preferable that the data processing method further comprises steps of:

detecting whether the first interface function and the second interface function are assigned to the first device and the second device correctly; and activating a negotiation protocol in a case where it is detected that the first interface function and the second interface function are incorrectly assigned, so that each of the first device and the second device has the other one of the first interface function and the second interface function.

For instance, the first device is a digital camera device, and the second device is a PDA device having both of the first interface function and the second interface function.

Alternatively, the first device is a digital camera device, and the second device is a printer having both of the first interface function and the second interface function.

In such a configuration, even if the user has erroneously inserted the connector of the USB cable into the devices, the devices will operate properly. Therefore, even when the second device is connected to the first device without awareness of the type of second device or the USB cable connection method, the second device operates properly. Therefore, improved operability is achieved.

Preferably, the step of transmitting the data is performed in a case where the first device is a digital camera device and the second device is a printer having a host-side interface of a USB. The step of transmitting the signal is performed in a case where the first device is a digital camera device and the second device is a printer having a device-side interface of the USB.

For example, when a direct printing printer as the second device is connected to the digital camera device as the first device, the function of the digital camera device for direct printing operation is enabled. When a printer other than the direct printing printer is connected to the digital camera device, the digital camera device performs the same operation as that of a printer driver installed in a personal computer and outputs a print control signal to the printer. Therefore, even when the user has connected the second device to the first device without awareness of the type of the second device, the second device operates properly. Therefore, improved operability is achieved.

In order to obtain the same advantages, according to the invention, there is also provided a data processing method, comprising steps of:

providing a first device comprising a communicator having a first interface function and a second interface function defined in an asymmetric interface standard;

connecting a second device to the first device;

detecting whether the second device has at least one of the first interface function and the second interface function;

transmitting data, from the first device to the second device, through use of the first interface function, in a case where it is detected that the second device has the second interface function; and exchanging the data, between the first device and a storage in the second device, through use of the second interface function, in a case where it is detected that the second device has the first interface function.

Preferably, the data includes at least one of image data, music data and motion picture data.

Preferably, it is detected that the second device has the first interface function in a case where a first type connector of a cable defined under the interface standard is connected to the communicator; and it is detected that the second device has the second interface function in a case where a second type connector of a cable defined under the interface standard is connected to the communicator.

Preferably, each of the steps of transmitting the data and the signal is performed on the basis of one of a plurality of USB classes in accordance with at least one of a type of the second device and an application executed in the second device.

Preferably, the interface standard is an On-The-Go standard of a USB. The first interface function is a device-side interface function of the USB; and the second interface function is a host-side interface function of the USB.

Here, it is preferable that the data processing method further comprises steps of:

detecting whether the first interface function and the second interface function are assigned to the first device and the second device correctly; and activating a negotiation protocol in a case where it is detected that the first interface function and the second interface function are incorrectly assigned, so that each of the first device and the second device has the other one of the first interface function and the second interface function.

For instance, the first device is a digital camera device, and the second device is a PDA device having both of the first interface function and the second interface function.

Alternatively, the first device is a digital camera device, and the second device is a printer having both of the first interface function and the second interface function.

Preferably, the step of transmitting the data is performed in a case where the first device is a digital camera device and the second device is a printer having a host-side interface of a USB. The step of exchanging the data is performed in a case where the first device is a digital camera device and the second device is a printer having a device-side interface of the USB.

For instance, when a direct printing printer as the second device is connected to the digital camera device as the first device, the function of the digital camera device for direct printing operation is enabled. When a personal computer as the second device is connected to the digital camera device, the digital camera device acts as an external storage of the personal computer. Therefore, even when the user has connected the second device to the first device without awareness of the type of the second device, the second device operates properly. Therefore, improved operability is achieved.

In order to obtain the same advantages, according to the invention, there is also provided a data processing method, comprising steps of:

providing a first device comprising a storage which stores data therein, and a communicator having a device-side interface function of a USB;

connecting a second device to the first device;

selecting one of a plurality of USB classes in accordance with at least one of a type of the second device and an application executed in the second device; and transmitting the data, from the first device to the second device, through use of the device-side interface function and based on the selected one of the USB classes.

Preferably, the data processing method further comprises steps of:

providing, in the first device, a plurality of interface descriptors each of which is associated with one of the USB classes; and transmitting all of the interface descriptors, in a case where the second device is adapted to at least one of the USB classes.

Here, it is preferable that the interface descriptors includes: a first interface descriptor for a first USB class used in a case where the second device is a printer having a host-side interface function of the USB; and a second interface descriptor for a second USB class used in a case where the first device serves as an external storage of the second device.

In such a configuration, even when any of totally different pieces of digital equipment, such as a printer and terminal equipment, is connected, the first device can work in conjunction with the digital equipment.

It is further preferable that the first USB class is a still image capture device class, and the second USB class is a mass storage class.

In such a configuration, if the second device to be connected to the first device corresponds to at least one of the still image capture device class and the mass storage class, the first device can work with the second device. Further, when the second device corresponds to both the still image capture device and the mass storage class, the USB class selected by the second device can be used. The first device can work with a larger number of applications of the second device.

Preferably, the data processing method further comprises steps of:

providing, in the first device, a first interface descriptor associated with a USB class, and a second interface descriptor associated with a vendor-extended USB class corresponding to the USB class;

transmitting, from the first device to the second device, the first interface descriptor and the second descriptor; and activating the second descriptor in a case where the first device receives a command for activating the second descriptor from the second device.

In such a configuration, when the second device to be connected to the first device can use a specific vendor-extended USB class, the first device can work with the second device by utilizing the specific extended USB class instead of a standard USB class. Specifically, an extended function can be readily added to a specific vendor.

In order to obtain the same advantages, according to the invention, there is also provided a data processing method, comprising steps of:

providing a first device comprising a storage which stores data therein, and a communicator having a host-side interface function of a USB;

connecting a second device to the first device;

selecting one of a plurality of USB classes in accordance with at least one of a type of the second device and an application executed in the second device; and transmitting the data, from the first device to the second device, through use of the host-side interface function and based on the selected one of the USB classes.

Preferably, the one of the USB classes is selected in accordance with a type of a descriptor transmitted from the second device.

In such a configuration, the type of the second device connected to the first device can be accurately detected on the basis of the USB descriptor.

According to the invention, there is also provided a first data processing device adapted to be connected to a second data processing device, the first data processing device comprising:

a storage, which stores data therein;

a communicator, having a first interface function and a second interface function defined in an asymmetric interface standard;

a first communications processor, operable to transmit the data to the second data processing device through use of the first interface function;

a second communications processor, operable to transmit a signal for processing the data to the second data processing device through use of the second interface function; and a controller, which activates the first communications processor, in a case where the second data processing device having the second interface function is connected to the communicator, and activates the second communications processor to transmit the data, in a case where the second data processing device having the first interface function is connected to the communicator.

According to the invention, there is also provided a first data processing device adapted to be connected to a second data processing device, the first data processing device comprising:

a storage, which stores data therein;

a communicator, having a first interface function and a second interface function defined in an asymmetric interface standard;

a first communications processor, operable to transmit the data to the second data processing device through use of the first interface function;

a second communications processor, operable to exchange the data between the first device and a storage in the second device through use of the second interface function; and a controller, which activates the first communications processor to transmit the data, in a case where the second data processing device having the second interface function is connected to the communicator, and activates the second communications processor to exchange the data, in a case where the second data processing device having the first interface function is connected to the communicator.

According to the invention, there is also provided a first data processing device adapted to be connected to a second data processing device, the first data processing device comprising:

a storage, which stores data therein;

a communicator, having a device-side interface function of a USB; and a communications processor, which transmits the data to the second image processing device, through use of the device-side interface function and based on one of a plurality of USB classes which is selected in accordance with at least one of a type of the second data processing device and an application executed in the second data processing device.

According to the invention, there is also provided a first data processing device adapted to be connected to a second data processing device, the first data processing device comprising:

a storage, which stores data therein;

a communicator, having a host-side interface function of a USB; and a communications processor, which transmits the data to the second image processing device, through use of the host-side interface function and based on one of a plurality of USB classes which is selected in accordance with at least one of a type of the second data processing device and an application executed in the second data processing device.

According to the invention, there is also provided a data processing system, comprising:

a first data processing device, comprising a storage which stores data; and a second data processing device, connected to the first data processing device to perform processing with respect to the data, wherein the first data processing device further comprises:
a communicator, having a first interface function and a second interface function defined in an asymmetric interface standard;
a first communications processor, operable to transmit the data to the second data processing device through use of the first interface function;
a second communications processor, operable to transmit a signal for processing the data to the second data processing device through use of the second interface function; and
a controller, which activates the first communications processor, in a case where the second data processing device having the second interface function is connected to the communicator, and activates the second communications processor to transmit the data, in a case where the second data processing device having the first interface function is connected to the communicator.

According to the invention, there is also provided a data processing system, comprising:
a first data processing device, comprising a storage which stores data; and
a second data processing device, connected to the first data processing device to perform processing with respect to the data,
wherein the first data processing device further comprises:
a communicator, having a first interface function and a second interface function defined in an asymmetric interface standard;
a first communications processor, operable to transmit the data to the second data processing device through use of the first interface function;
a second communications processor, operable to exchange the data between the first device and a storage in the second device through use of the second interface function; and
a controller, which activates the first communications processor to transmit the data, in a case where the second data processing device having the second interface function is connected to the communicator, and activates the second communications processor to exchange the data, in a case where the second data processing device having the first interface function is connected to the communicator.

According to the invention, there is also provided a data processing system, comprising:
a first data processing device, comprising a storage which stores data; and
a second data processing device, connected to the first data processing device to perform processing with respect to the data,
wherein the first data processing device further comprises:
a communicator, having a device-side interface function of a USB; and
a communications processor, which transmits the data to the second image processing device, through use of the device-side interface function and based on one of a plurality of USB classes which is selected in accordance with at least one of a type of the second data processing device and an application executed in the second data processing device.

According to the invention, there is also provided a data processing system, comprising:
a first data processing device, comprising a storage which stores data; and a second data processing device, connected to the first data processing device to perform processing with respect to the data,
wherein the first data processing device further comprises:
a communicator, having a host-side interface function of a USB; and
a communications processor, which transmits the data to the second image processing device, through use of the host-side interface function and based on one of a plurality of USB classes which is selected in accordance with at least one of a type of the second data processing device and an application executed in the second data processing device.

BRIEF DESCRIPTION OF THE DRAWINGS

The above objects and advantages of the present invention will become more apparent by describing in detail preferred exemplary embodiments thereof with reference to the accompanying drawings, wherein:
FIG. 13 is a view hierarchically showing a processor to be implemented by a device communications processor in a digital camera device serving as a data input device according to a second embodiment of the invention.

DETAILED DESCRIPTION OF THE INVENTION

Figure 1:
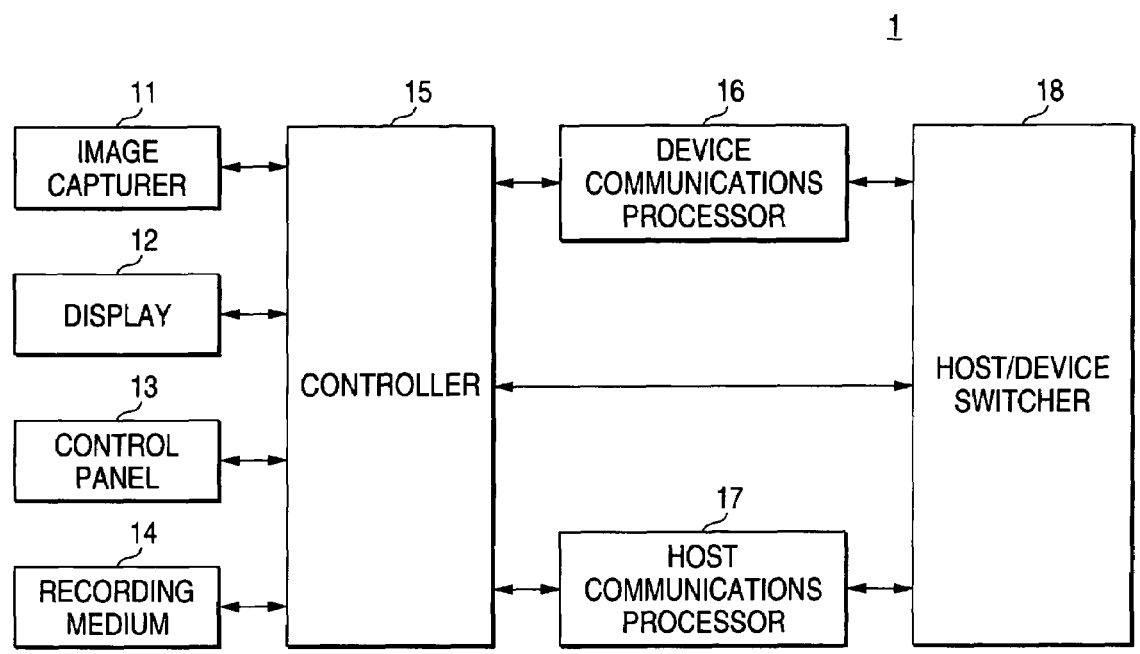
FIG. 1 is a block diagram showing the configuration of a digital camera device serving as a data input device according to a first embodiment of the invention.

Embodiments of the invention will be described below in detail with reference to the accompanying drawings.
FIG. 1 shows a digital camera device serving as a data input device according to a first embodiment of the invention. In this digital camera device 1, an image capturer 11 is constituted of an optical system, such as a lens, and an image capturing element; e.g., a CCD (Charge-Coupled Device). A display 12 is such as a liquid-crystal display used for displaying a menu and a finder and for browsing a captured image. A control panel 13 is constituted of button switches, used for selecting menu items, for executing the image caption or the like.

A recording medium 14 is for storing image data pertaining to a captured subject. The recording medium 14 may be a recording medium such as semiconductor memory fixedly incorporated in the digital camera device 1, or a recording medium such as a memory card removably connected to the digital camera device 1. Non-volatile memory or volatile memory is used for the semiconductor memory, as required. In addition to the semiconductor memory, recording media of different types, such as a recording medium of a magnetic recording type and a recording medium of an optical recording type, may be used as the recording medium 14.

A controller 15 is for controlling individual sections in accordance with an operation of the control panel 13 performed by the user or a command from the outside, and for performing various types of information processing operations, such as image processing. A device communications processor 16 performs processing for establishing communication with digital equipment serving as a USB host when the digital equipment is connected to a host/device switcher 18. A host communications processor 17 is a circuit which performs processing for establishing communication with digital equipment serving as a USB device when the digital equipment is connected to the host/device switcher 18.

The controller 15, the device communications processor 16, and the host communications processor 17 may be embodied as a control program in which processing to be described later is described and as a computer for executing the control program. Otherwise, they may be implemented as a custom-designed processing circuit or embodied by use of the control program, the computer, and the processing circuit.

In relation to interface standards which impart different roles to a first interface circuit of one of two pieces of mutually-connected equipment and a second interface circuit of the remaining piece of equipment, the host/device switcher 18 has both functions of the first interface circuit and functions of the second interface circuit. In the first embodiment, the host/device switcher 18 is embodied as a circuit on which functions specified by the On-The-Go standards of a USB are implemented.

Next will be described the device communications processor 16 with reference to FIGS. 2 and 3.

Figure 2:
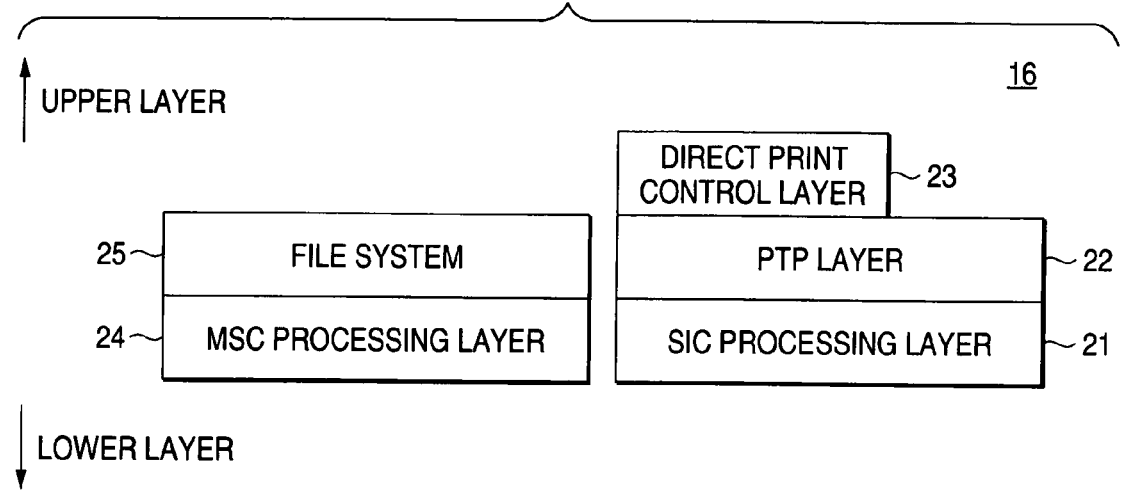
FIG. 2 is a view hierarchically showing a device communications processor in the digital camera device of FIG. 1.

As shown in FIG. 2, the device communications processor 16 is equipped with a still image capture device class (SIC) processing layer 21, a picture transfer protocol (PTP) layer 22, and a direct print control layer 23. The SIC processing layer 21 corresponds to a communications entity which establishes communication at a USB still image capture device class through use of the host/device switcher 18. The PTP layer 22 corresponds to a communications entity capable of managing the data recorded on the recording medium 14 at a class higher than the SIC processing layer 21, in accordance with a PTP by way of digital equipment connected to the digital camera device 1. The direct print control layer 23 corresponds to a communications entity which performs direct printing operation by exchanging text control information (e.g., a control command, a control response, a status report, or the like) described in an XML (extensible Markup Language) script at a level higher than the PTP layer 22.

Figure 3:
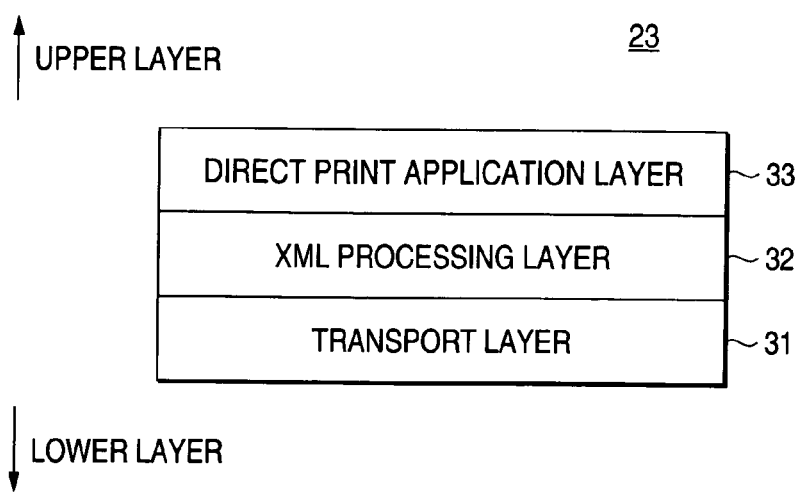
FIG. 3 is a view hierarchically showing details of a direct print control layer implemented by the device communications processor of FIG. 2.

As shown in FIG. 3, the direct print control layer 23 comprises a transport layer 31, an XML processing layer 32, and a direct print application layer 33. The transport layer 31 corresponds to a communications entity for managing exchange of the XML script used for describing the control information. The XML processing layer 32 corresponds to a communications entity for generating and/or interpreting the XML script used for describing control information. The direct print application layer 33 corresponds to a communications entity for executing direct printing processing while managing generation and exchange of the control information. When the device communications processor 16 performs direct printing operation, the image data file stored in the recording medium 14 of the digital camera device 1 is transferred to the printer in unmodified form. The printer converts the image data into a print control command and prints images.

Further, the device communications processor 16 is equipped with a mass storage class processing layer 24 which establishes communication at a USB mass storage class through use of the host/device switcher 18, and a file system 25 for managing, as files, the data recorded on the recording medium 14 at a level higher than the mass storage class processing layer 24.

Specifically, when the digital equipment is connected to the digital camera device 1 as an external storage, the device communications processor 16 uses the SIC processing layer 21 and the PTP layer 22 for establishing communication with the digital equipment and processing a command from the digital equipment. Alternatively, in this case, the device communications processor 16 employs the mass storage class processing layer 24 and the file system 25 for establishing communication with the digital equipment and processing a command from the digital equipment.

In a case where the digital equipment connected to the digital camera device 1 is a printer for direct printing purpose, the device communications processor 16 employs the SIC processing layer 21, the PTP layer 22, and the direct print control layer 23 for establishing communication with the digital equipment and processing a command from the digital equipment.

Figure 4:
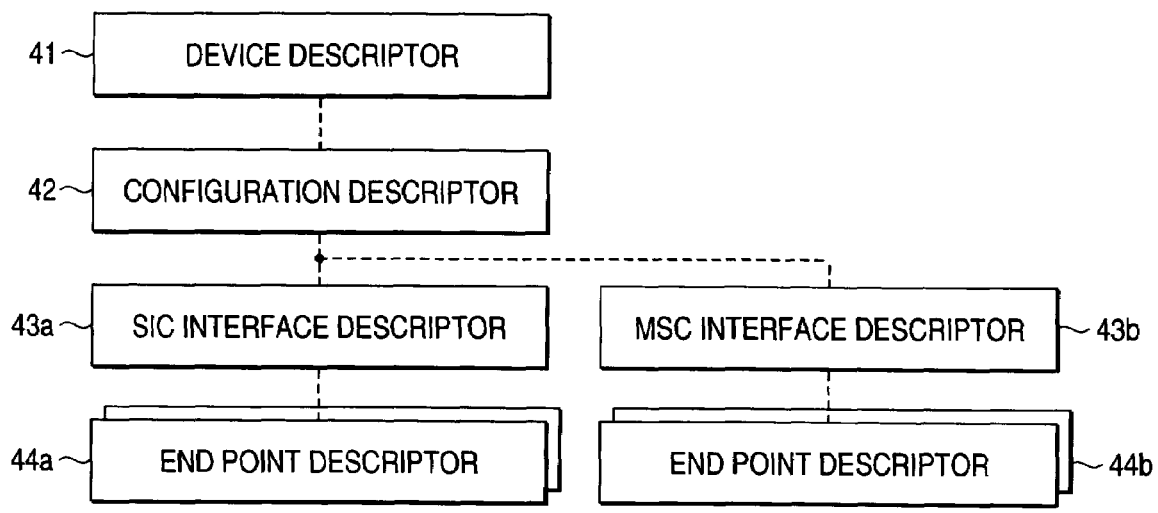
FIG. 4 is a view showing a plurality of channels of descriptors provided for performing device-side processing of the digital camera device of FIG. 1.

As mentioned above, the digital camera device 1 is a composite device equipped with a plurality of USB classes. Hence, the digital camera device 1 is equipped with a plurality of channels of descriptors. FIG. 4 is a view showing a plurality of channels of descriptors provided for performing device-side processing of the digital camera device 1.

The descriptors of the USB correspond to data including information about pieces of equipment of respective USB devices and are transmitted to the USB host when the USB equipment is connected to the digital camera device 1. The descriptors include a device descriptor, a configuration descriptor, an interface descriptor, and an end point descriptor. The device descriptors include vendor information, product information, a serial number, USB version information, or the like. The configuration descriptor includes information, such as the number of interfaces and power required by the equipment. A USB class which can be used by the equipment is set in the interface descriptor. The end point descriptor defines a pipe which is a communications path between the connected equipment and the digital camera device 1.

As shown in FIG. 4, the digital camera device 1 has a common device descriptor 41 and a common configuration descriptor 42 as standard descriptors. The digital camera device 1 has, as a first channel and at a level lower than the descriptors 41 and 42, an SIC interface descriptor 43a, and an end point descriptor 44a for use with the SIC. Further, the digital camera device 1 has, as a second channel, an MSC interface descriptor 43b, and an end point descriptor 44b for the MSC. Two types of end point descriptors 44a; i.e., a data-in end point descriptor and a data-output end point descriptor, are prepared for one interface. Likewise, two descriptors are prepared also for the end point descriptor 44b.

The host communications processor 17 will now be described with reference to FIG. 5. The host communications processor 17 is equipped with a printer class processing layer 61 for establishing communication at an USB printer class through use of the host/device switcher 18, and a direct print application layer 62 for performing direct printing operation by transmitting a print control command to a printer. When the host communications processor 17 performs direct printing operation, the image data stored in the recording medium 14 of the digital camera device 1 are converted into a print control command, and the print control command is transferred to the printer, whereupon the printer prints an image in accordance with the print control command.

Figure 6:
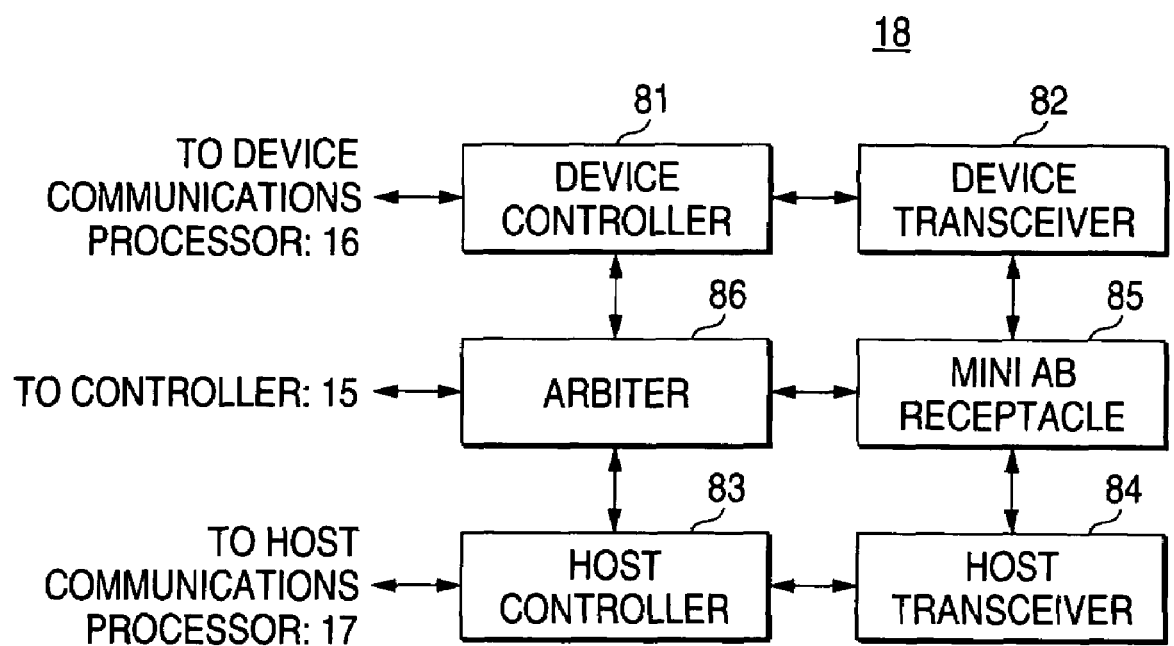
FIG. 6 is a block diagram showing the configuration of a host/device switcher in the digital camera device of FIG. 1.

Next, the host/device switcher 18 is described with reference to FIG. 6. A device controller 81 is a controller which controls a device transceiver 82, provides, as a transfer signal to the device transceiver 82, digital data to be transferred, and outputs as digital data the transfer signal received by the device transceiver 82. The device transceiver 82 is a device-side communications circuit and a device-side modulation/demodulation circuit for use with a transfer signal. The device controller 81 and the device transceiver 82 serve as the device-side interface circuit of the digital camera device 1 (corresponding to the first interface circuit).

A host controller 83 is a controller for controlling a host transceiver 84. The host controller 83 is a circuit which supplies, to the host transceiver 84 as a transfer signal, digital data to be transferred, and outputs the transfer signal received by the host transceiver 84 as receipt digital data. The host transceiver 84 is a host-side communications circuit and a host-side demodulation circuit for use with a transfer signal. The host controller 83 and the host transceiver 84 serve as a host-side interface circuit of the digital camera device 1 (corresponding to the second interface circuit).

A mini AB receptacle 85 is a connector which enables connection of a mini A terminal of a USB cable and a mini B terminal of a USB cable. An arbiter 86 monitors the status of connection of a USB cable with the mini AB receptacle 85. When a mini A terminal is connected to the mini AB receptacle 85, the arbiter 86 deactivates the device controller 81 and the device transceiver 82 and activates the host controller 83 and the host transceiver 84. When a mini B terminal is connected to the mini AB receptacle 85, the arbiter 86 deactivates the host controller 83 and the host transceiver 84 and activates the device controller 81 and the device transceiver 82.

Figure 7:
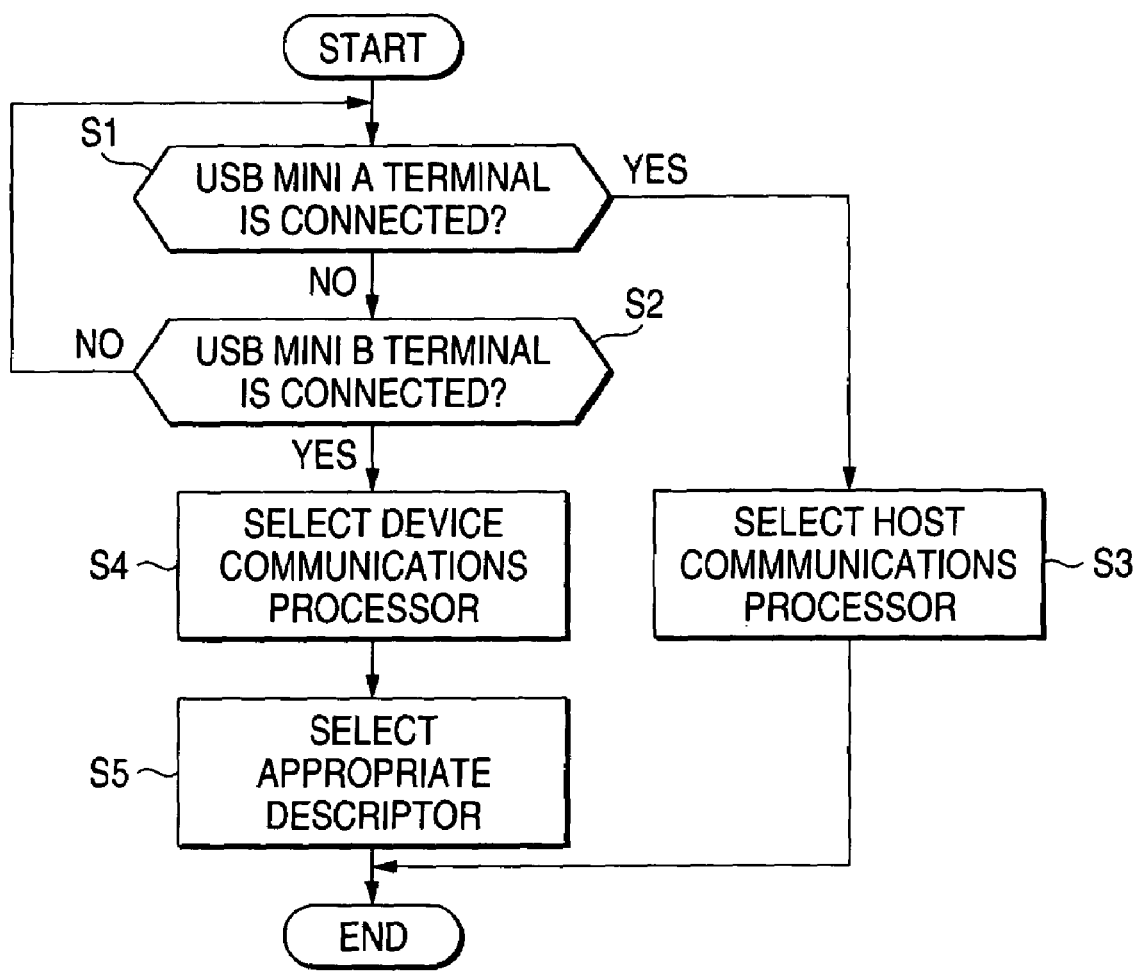
FIG. 7 is a flowchart for describing operation of the digital camera device of FIG. 1.

Operation of the digital camera device will now be described with reference to a flowchart of FIG. 7.

The host/device switcher 18 remains in a standby condition until the mini A terminal of the USB cable or the mini B terminal of the same is connected to the receptacle (steps S1, S2).

When the mini A terminal of the USB cable is connected to the host/device switcher 18, the host/device switcher 18 detects occurrence of connecting action and enables the USB host function thereof. In order to establish communication with the connected digital equipment, the controller 15 selects the host communications processor 17 and supplies a communications start command to the host communications processor 17 (step S3).

In the host/device switcher 18, the arbiter 86 monitors the mini AB receptacle 85 at that time. When the mini A terminal is inserted into the mini AB receptacle 85, the arbiter 86 causes the host controller 83 to start processing. Here, the arbiter 86 determines whether the connected terminal is a mini A terminal or a mini B terminal, on the basis of the voltage level of an ID line added to the mini A terminal and that of the ID line added to the mini B terminal.

When the mini A terminal is connected, the arbiter 86 sends, to the controller 15, a report indicating that the connected terminal is a mini A terminal. On the basis of this signal output from the arbiter 86, the controller 15 detects the mini A terminal having been connected with the host/device switcher 18 and supplies the communications start command to the host communications processor 17.

When the mini B terminal of the USB cable is connected to the host/device switcher 18, difficulty is encountered in determining whether or not the USB host is connected, on the basis of only the level of the ID line. Therefore, the host/device switcher 18 refers to the level of a VBus terminal. When the voltage of the VBus terminal has reached a predetermined voltage, the mini B terminal is determined to have been connected to the host/device switcher 18. Specifically, connection of the USB host is ascertained by way of the USB cable. In such a case, the host/device switcher 18 enables the USB device function thereof. The controller 15 selects the device communications processor 16 for establishing communication with the connected digital equipment and supplies a communications start command to the device communications processor 16 (step S4).

In the host/device switcher 18, when a mini B terminal is inserted into the mini AB receptacle 85, the arbiter 86 causes the device controller 81 to initiate processing. When the terminal is connected, the arbiter 86 sends to the controller 15 a signal indicating that the connected terminal is a mini A terminal or a mini B terminal. On the basis of the signal from the arbiter 86, the controller 15 detects the mini B terminal having been connected to the host/device switcher 18 and supplies the communications start command to the device communications processor 16.

In this case, in response to the request from the connected digital equipment, the device communications processor 16 transmits all or a portion of the descriptors.

For instance, the controller 15 displays on the display 12 a list of types of digital equipment which can be connected to the digital camera device 1. In accordance with operation of the control panel 13 performed by the user, the type of the connected digital equipment is ascertained, and descriptors of a predetermined USB class for establishing communication with the digital equipment are selected (step S5).

Alternatively, the controller 15 selects all descriptors of USB classes corresponding to types of digital equipment which can be connected to the digital camera device 1. The device communications processor 16 transmits all the descriptors to the connected digital equipment. In accordance with a command from the digital equipment and/or a protocol or application used at a level higher than the USB, a USB class to be used for establishing communication with the digital equipment is determined.

When the communications function has been selected in this way, applications, such as direct printing operation or transfer of an image data file or file information to a personal computer, are implemented.

Specific operation of the digital camera device 1 performed when various pieces of digital equipment are connected to the digital camera device 1 will now be described.

First will be described a case where a direct printing printer 101 is connected to the digital camera device 1 with reference to FIG. 8.

The direct printing printer 101 has a host-side interface serving as a USB interface and acquires an image data file. After having subjected the image data file to image processing, such as color conversion processing or halftone processing, as required, the printer converts the image data into a print control command. On the basis of the print control command, the printer prints an image described in the image data file. Here, the direct printing printer 101 may be a printer dedicated for direct printing or may have a device-side interface of another USB, receive a print control command from terminal equipment, such as a personal computer, by way of the device-side interface, and perform printing operation.

A USB cable 2-1 is a cable whose one terminal is embodied as a mini B terminal 2*mb* and whose other terminal is embodied as a type-A terminal 2*a*.

Figure 8:
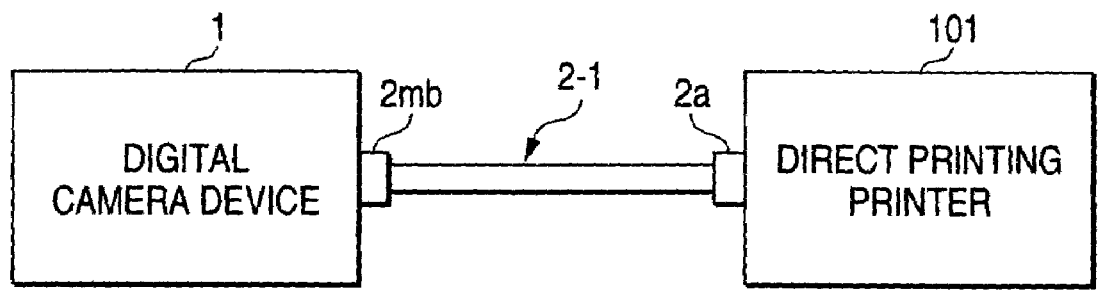
FIG. 8 is a block diagram showing that a direct printing printer is connected to the digital camera device of FIG. 1.

As shown in FIG. 8, when the direct printing printer 101 is connected to the digital camera device 1 by way of the USB cable 2-1, the type-A terminal 2*a* of the USB cable 2-1 is inserted into the direct printing printer 101, and the mini B terminal 2*mb* of the USB cable 2-1 is inserted into the digital camera device 1.

In the digital camera device 1, when the mini B terminal 2*mb* of the USB cable 2-1 is inserted into the mini AB receptacle 85 of the host/device switcher 18, the arbiter 86 and the controller 15 of the host/device switcher 18 render the device communications processor 16, the device controller 81 and the device transceiver 82 of the host/device switcher 18 active and capable of performing communication processing.

When the type of the connected equipment is set to the direct printing printer 101 by the user, the device communications processor 16 transmits the SIC interface descriptor 43*a* in accordance with a request from the direct printing printer 101, because a direct printing protocol for exchanging control information described in an XML, a PTP, and a SIC of a USB are used during direct printing operation. Further, USB communication with the direct printing printer 101 is performed through use of the SIC.

Alternatively, when the particular type of connected equipment is not specified, the digital camera device 1 has not yet detected the type of connected equipment at a point in time when the direct printing printer 101 is connected. Therefore, the device communications processor 16 transmits a set of SIC interface descriptors 43*a*, and another set of MSC interface descriptors 43*b* in accordance with the request from the direct printing printer 101. Subsequently, in order to perform direct printing operation, the direct printing printer 101 establishes communication with the digital camera device 1 while taking the USB class as the SIC.

When the SIC is used as a USB class during communication with the direct printing printer 101 through use of a USB, the device communications processor 16 causes the PTP layer 22 to perform PTP processing at a level higher than the SIC. Having ascertained that a common direct printing protocol is valid, through use of a PTP, the direct printing printer 101 and the device communications processor 16 determine that both the printer and the processor can perform communication processing pertaining to direct printing, and start direct printing operation, as required.

Second, there will be described a case where a PC printer 102 is connected to the digital camera device 1 with reference to FIG. 9. The PC printer 102 is a printer which has a device interface serving as a USB interface, receives a print control command from the personal computer, and prints an image in accordance with the print control command.

A USB cable 2-2 is a cable whose one terminal is embodied as a mini A terminal 2*ma* and whose other terminal is embodied as a type-B terminal 2*b*.

Figure 9:
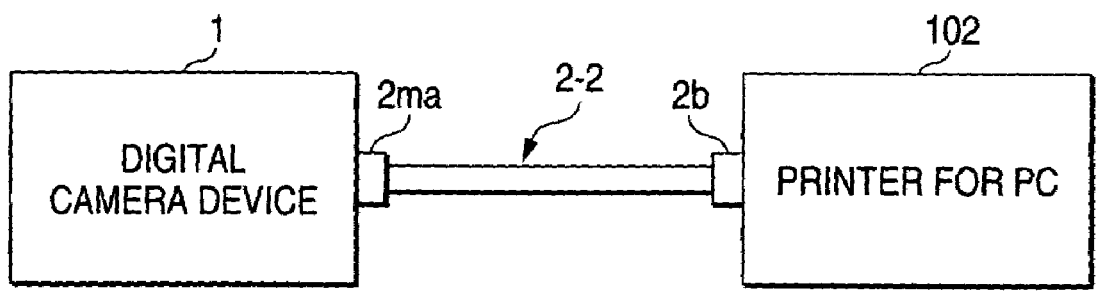
FIG. 9 is a block diagram showing that a PC printer is connected to the digital camera device of FIG. 1.

As shown in FIG. 9, when the PC printer 102 is connected to the digital camera device 1 by way of the USB cable 2-2, the type-B terminal 2*b* of the USB cable 2-2 is inserted into the PC printer 102, and the mini A terminal 2*ma* of the USB cable 2-2 is inserted into the digital camera device 1.

In the digital camera device 1, when the mini A terminal 2*ma* of the USB cable 2-2 is inserted into the mini AB receptacle 85 of the host/device switcher 18, the host communications processor 17, the host controller 83 and the host transceiver 84 of the host/device switcher 18 are rendered active and able to perform communication processing by the arbiter 86 of the host/device switcher 18 and the controller 15.

When the type of the connected equipment is set as the PC printer 102 by the user, the controller 15 reads the image data file stored in the recording medium 14 and subjects image data of the data file to image processing such as color conversion processing and halftone processing, thereby generating a print control command from the image data that have been processed. In such a case, the host communications processor 17 transmits a print control command to the PC printer 102. The host communications processor 17 takes a USB class to be used for communication with the PC printer 102 as a printer class in advance.

In the first embodiment, the digital camera device 1 acts as a USB host only when the PC printer 102 is connected to the camera. Therefore, even if the particular type of connected equipment has not been specified, the digital camera device 1 may be configured to act in the manner as mentioned the above when the mini A terminal 2*ma* is connected to the digital camera device 1.

In this way, when the PC printer 102 is connected to the digital camera device 1, the digital camera device 1 renders the host communications processor 17 active and performs communication while taking oneself as a USB host and the PC printer 102 as a USB device.

When communication with the PC printer 102 by way of the USB has become possible, the controller 15 executes the print application program or the like, as required. In accordance with the user's operation, the controller 15 converts image data into a print control command, and the host communications processor 17 transmits the print control command to the PC printer 102.

Third, there will be described a case where a personal computer 103 is connected to the digital camera device 1 with reference to FIG. 10. The personal computer 103 is a device having: a CPU; a RAM; a ROM; a hard disk drive storing programs, such as an operating system and various applications, and data; and a USB host interface serving as an external interface.

Generally, an image data file management program for transferring the image data file stored in the digital camera device can be installed in the personal computer 103. A device driver or library for enabling transfer of files at a USB mass storage class at a level lower than the image data file management program or transfer of files at a USB still image capture device class or a PTP can also be installed in the personal computer 103.

The USB cable 2-1 is a cable whose one terminal is embodied as a mini A terminal 2*mb* and whose other terminal is embodied as a type-A terminal 2*a*.

Figure 10:
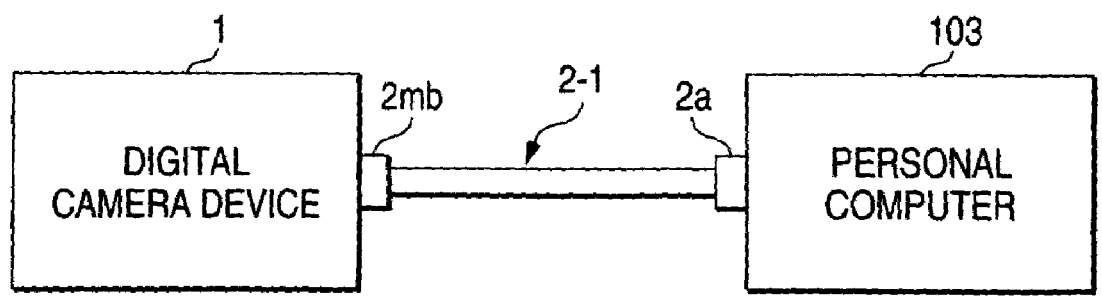
FIG. 10 is a block diagram showing that a personal computer is connected to the digital camera device of FIG. 1.

As shown in FIG. 10, when the personal computer 103 is connected to the digital camera device 1 by way of the USB cable 2-1, the type-A terminal 2*a* of the USB cable 2-1 is inserted into the personal computer 103, and the mini B terminal 2*mb* of the USB cable 2-1 is inserted into the digital camera device 1.

In the digital camera device 1, when the mini B terminal 2*mb* of the USB cable 2-1 is inserted into the mini AB receptacle 85 of the host/device switcher 18, the device communications processor 16 and the device controller 81 and the device transceiver 82 of the host/device switcher 18 are rendered active and able to perform communication processing by the arbiter 86 and the controller 15 of the host/device switcher 18.

When the type of connected equipment is specified, by the user, as a personal computer 103 using a SIC, the device communications processor 16 transmits an SIC interface descriptor 43a in response to a request from the personal computer 103 and establishes USB communication with the personal computer 103 through use of the SIC.

When the type of connected equipment is specified, by the user, as a personal computer 103 using a MSC, the device communications processor 16 transmits an MSC interface descriptor 43b in response to the request from the personal computer 103 and establishes USB communication with the personal computer 103 through use of the MSC.

Alternatively, when the type of connected equipment is specified to the personal computer 103 capable of using both the MSC and the SIC by the user and when the particular type of connected equipment has not been set, the device communications processor 16 transmits the interface descriptor for use with a still image capture device class and the interface descriptor for use with a mass storage class in accordance with a request from the personal computer 103. Subsequently, in accordance with the command from the personal computer 103, the device communications processor 16 sets the USB class to be used for communication with the personal computer 103 to the still image capture device class or the mass storage class.

As mentioned above, when the personal computer 103 is connected to the digital camera device 1, the digital camera device 1 renders the device communications processor 16 active and, in accordance with the command from the personal computer 103, sets the USB class to be used for USB communication with the personal computer 103 to the SIC or the MSC.

When the device communications processor 16 has selected the MSC, the device communications processor 16 and the controller 15 perform reading/writing of an image data file and transmission of file information to the personal computer 103 in accordance with a command from the personal computer 103.

When the device communications processor 16 has selected the SIC, the device communications processor 16 and the controller 15 perform reading/writing of the image data file and transmission of the file information to the personal computer 103 on the basis of a PTP working at a level higher than the processor 16 and the controller 15, in accordance with a command from the personal computer 103.

The user sets the type of connected equipment by selecting any one from a plurality of items, in a menu, showing the types of pieces of connected equipment. At that time, the display 12, the control panel 13, and the controller 15 serve as user interfaces.

Figure 11A:
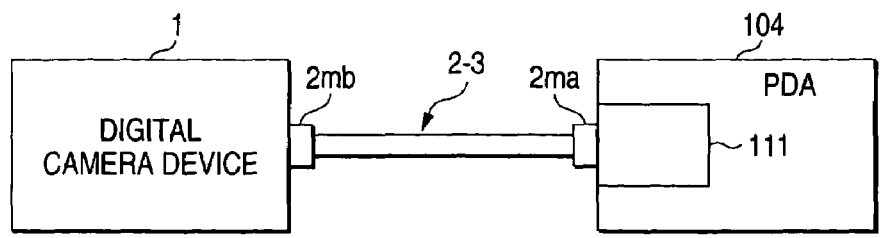
FIGS. 11A and 11B are block diagrams showing states that a PDA equipped with a communications circuit having a USB host function and a USB device function is connected to the digital camera device of FIG. 1.

Fourth, there will be described a case where a PDA (Personal Digital Assistant) equipped with a communications circuit having the USB host function and the USB device function is connected to the digital camera device 1 with reference to FIGS. 11A and 11B.

Here, the PDA 104 is a compact computer system having a CPU, a ROM, a RAM, a memory card, and a liquid crystal display. The PDA 104 is further equipped with a communications circuit 111 having both the USB host function and the USB device function.

Since the PDA 104 is one type of compact computer system when connected to the digital camera device 1, the PDA 104 is connected to the digital camera device 1 for the same purpose as that achieved when the personal computer 103 is connected to the digital camera device 1. Consequently, in this case, the PDA 104 acts as a USB host. In contrast, when connected to a personal computer or the like, the PDA 104 is recognized as an external storage. Therefore, in this case, the PDA acts as a USB device. Like the PDA 104, there exists a PDA equipped with a communications circuit having the USB host function and the USB device function (i.e., the On-The-Go function).

Therefore, the communications circuit 111 of the PDA 104 incorporates a circuit analogous to the host/device switcher 18 and enables physical connection of a mini A terminal and a mini B terminal.

The PDA 104 and the digital camera device 1 are connected together by a USB cable 2-3 having a mini A terminal 2ma at one end thereof and a mini B terminal 2mb at the other end thereof. A physical connection method employed at that time includes a method for inserting the mini B terminal 2ma is inserted into the digital camera device 1 and inserting the mini B terminal 2mb into the PDA 104 (see FIG. 11B) and a method for inserting the mini B terminal 2mb into the digital camera device 1 and the mini A terminal 2ma into the PDA 104 (see FIG. 11A).

When the PDA 104 is connected to the digital camera device 1, the digital camera device 1 acts as a USB device in view of the objective thereof, and the PDA 104 acts as a USB host. For this reason, a connection method shown in FIG. 11A is correct. When the user has interconnected the digital camera device 1 and the PDA 104 by the connection method shown in FIG. 11A, the digital camera device 1 operates in the same manner as in the case where the personal computer 103 is connected to the digital camera device 1.

Figure 11B:
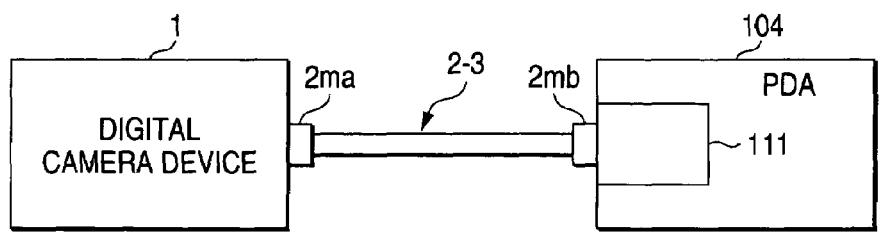

When the user has interconnected the digital camera device 1 and the PDA 104 by the connection method shown in FIG. 11B, the PDA 104 starts operating as a USB device, and the digital camera device 1 starts operating as a USB host. The PDA 104 detects an error in the connection method and switches the PDA 104 to the USB host and the digital camera device 1 to the USB device by a host negotiation protocol. An error in the connection method is detected by a protocol or application located at a level higher than the USB when the digital camera device 1 attempts to start communication processing. After the relationship between the USB host and the USB device has been corrected, the digital camera device 1 and the PDA 104 perform communication processing in the same manner as in the case shown in FIG. 11A.

A session request protocol and a host negotiation protocol are used for switching between the USB host and the USB device. At that time, potentials of respective lines and those of respective terminals (D+, D−, VBus) other than the ground potential (GND) in the USB cable are controlled. The USB host of the USB-On-The-Go is required to supply power of five volts and eight milliamperes over a Vbus line. However, if power is supplied at all times, electric power consumption will increase. For this reason, the USB host can stop power supply. The session request protocol is for requesting power supply from the USB device to the USB host by way of the VBus line. Prior to a host negotiation protocol, the session request protocol is carried out. Switching between the USB host and the USB device will be hereinbelow described in detail.

The equipment connected with the mini A or type-A connector operates as a USB host by default. Upon detection of the equipment (e.g., a USB device) connected with the mini B or type-B connector, the USB host acquires a USB descriptor from the USB device. At that time, the USB device transmits, to the USB host, the On-The-Go descriptor describing support of the host negotiation protocol.

The equipment connected with the mini A or type-A connector issues a Set_Feature request in order to enable the host negotiation protocol function of the equipment connected with the mini B or type-B connector. As a result, when the equipment connected with the mini A or type-A connector does not use any USB bus, the equipment shifts to a suspended state (i.e., a state in which no traffic is present in the bus). As a result, the equipment connected with the mini B or type-B connector is given a chance of acquiring the USB host function.

Next, the equipment connected with the mini B or type-B connector sets the level of a D+ line to a low level as if a device (equipment in the embodiment) were disconnected from the USB cable, thereby activating pull-down resistors of respective D+ and D− lines. Upon detection of the levels of the lines remaining at a low level, the equipment connected with the mini A or type-A connector initiates connecting operation as a USB device, thereby pulling up the D+ line.

Subsequently, the equipment connected with the mini A or type-A connector operates as a USB device, and the equipment connected with the mini B or type-B connector operates as a USB host.

In this way, the two pieces of connected equipment can be switched between the USB host and the USB device.

Therefore, in the case of use of a USB cable 2-3 having the mini A terminal 2ma and the mini B terminal 2mb, even if an error has arisen in the connection method, the digital camera device 1 operates normally.

Fifth, there will be described a case where a printer having a communications circuit having both the USB host function and the USB device function is connected to the digital camera device 1, with reference to FIGS. 12A and 12B.

The printer 105 has the communications circuit 121. The communications circuit 121 for receiving an image data file and a print control command has the function of a direct printing printer which receives an image data file, subjects the image data file to image processing to generate a print control command, and performs printing operation in accordance with the print control command. The communications circuit 121 also has the function of a PC printer which receives a print control command and performs printing operation in accordance with the print control command. Like the communications circuit 111, the communications circuit 121 is a circuit having the USB host function and the USB device function.

When connected to a digital camera device specifically designed for use in direct printing operation (i.e., when receiving an image data file), the printer 105 operates as a USB host. In contrast, when connected to terminal equipment such as a personal computer (i.e., when receiving a print control command), the printer 105 operates as a USB device. Consequently, the communications circuit 121 of the printer 105 incorporates a circuit analogous to the host/device switcher 18 and can be physically connected to the mini A terminal and the mini B terminal.

The printer 105 and the digital camera device 1 are connected together by a USB cable 2-3 having the mini A terminal 2ma at one end thereof and the mini B terminal 2mb at the other end thereof. A physical connection method employed at that time includes a method for inserting the mini A terminal 2ma into the digital camera device 1 and inserting the mini B terminal 2mb into the printer 105 (see FIG. 12A), and a method for inserting the mini B terminal 2mb into the digital camera device 1 and inserting the mini A terminal 2ma into the printer 105 (see FIG. 12B).

Figure 12A:
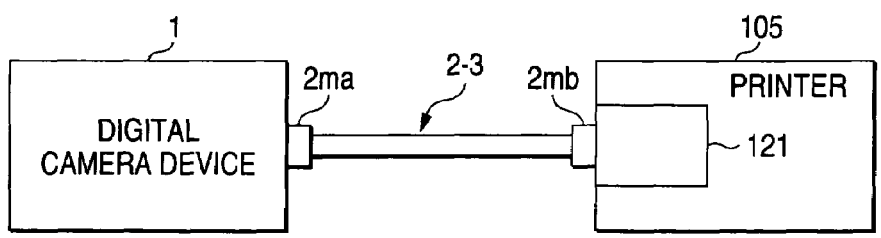
FIGS. 12A and 12B are block diagrams showing states that a printer having a communications circuit having the USB host function and the USB device function is connected to the digital camera device of FIG. 1.
Figure 12B:
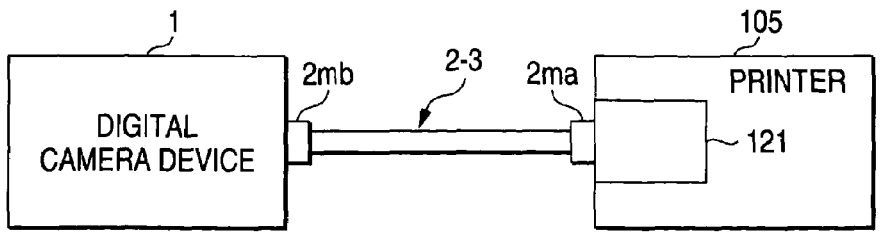

When the user has interconnected the digital camera device 1 and the printer 105 by the connection method shown in FIG. 12A, the digital camera device 1 operates in the same manner as in the case where the PC printer 102 is connected to the digital camera device 1. When the user has interconnected the digital camera device 1 and the printer 105 by the connection method shown in FIG. 12B, the digital camera device 1 operates in the same manner as in the case where the direct printing printer 101 is connected to the digital camera device 1.

Therefore, when the USB cable 2-3 having the mini A terminal 2ma and the mini B terminal 2mb is used, an image based on the image data file of the digital camera device 1 is printed by the printer 105 by any connection method.

In a case where the direct printing is executed by connecting a printer to a digital camera device capable of serving as both of the host and the device, there may be configured such that the host or the device is determined so as to select the one capable of performing print processing faster. When the digital camera device serves as the host, the printer serves as the device, and vice versa.

In a case where the printer is provided with a sufficient storage capacity, it is preferable that the digital camera device serves as the host. In such a case, the printer does not need to frequently access the digital camera device to acquire image data therefrom.

In this embodiment, the digital camera device 1 comprises:
the recording medium 14 for storing image data as files;
the host/device switcher 18 having both the function of the first interface circuit and that of the second interface circuit in connection with the interface regulations that impart different roles to the first and second interface circuits of two pieces of interconnected equipment;
the device communications processor 16 for transmitting an image data file to the direct printing printer 101;
the host communications processor 17 for transmitting to the PC printer 102 a print control command corresponding to image data; and
the controller 15 that transmits the image data file to the direct printing printer 101 through use of the function of the first interface circuit of the host/device switcher 18 and the device communications processor 16 when having determined that the direct printing printer 101 having the second interface circuit has been connected to the host/device switcher 18, and that transmits the print control command to the PC printer 102 through use of the function of the second interface circuit of the host/device switcher 18 and the host communications processor 17 when having determined that the PC printer 102 having the first interface circuit is connected to the host/device switcher 18.

In such a configuration, the digital camera device can work in conjunction with a larger number of pieces of digital equipment (printers) among the pieces of digital equipment (printers) which can be physically connected by way of a cable. Therefore, there can be diminished occurrence of a problem for the user, such as a problem of difficulty being encountered when a digital camera device fails to utilize digital equipment (e.g., a printer) though the digital equipment can be physically connected to the digital equipment.

In this embodiment, when a first connector of a cable conforming to the interface regulations is connected to the mini AB receptacle 85 of the host/device switcher 18, the controller 15 and the arbiter 86 determine that the direct printing printer 101 having the first interface circuit has been connected to the receptacle 85. When the second connector different from the first connector of the cable conforming to the interface standards is connected to the mini AB receptacle 85 of the host/device switcher 18, the controller 15 and the arbiter 86 determine that the PC printer 102 having the second interface circuit is connected to the receptacle by way of the cable.

In such a configuration, the type of communication processing required by the digital camera device 1 can be readily identified. That is, it is identified whether the communication processing corresponds to the processing for which the device communications processor 16 is responsible or the processing for which the host communications processor 17 is responsible.

In this embodiment, the digital camera device 1 uses the On-The-Go standards for a USB as interface standards, uses a device interface circuit as the first interface circuit, and uses a host control interface circuit as the second interface circuit.

In such a configuration, the digital camera device 1 can work in conjunction with a larger number of pieces of digital equipment among the pieces of digital equipment that have USB interfaces and can be physically connected to the digital camera device 1. Therefore, there can be diminished occurrence of a problem for the user, such as a problem of difficulty being encountered when a digital camera device fails to utilize digital equipment (e.g., a printer) though the digital equipment can be physically connected to the digital equipment by way of a USB cable.

In this embodiment, when the digital camera device 1 serves as a USB device, the device communications processor 16 of the digital camera device 1 exchanges image data or attribute information about the image data with any one of a plurality of USB classes in accordance with the type of connected digital equipment or an application. Likewise, the host communications processor 17 may also establish communication with any one of the plurality of USB classes.

In such a configuration, even when various USB classes are used by the digital equipment to be connected, the digital camera device 1 can work in conjunction with a larger number of pieces of digital equipment among pieces of digital equipment which have USB interfaces and can be physically connected with the digital camera device 1.

In this embodiment, the digital camera device 1 comprises a USB device interface circuit (i.e., the device controller 81 and the device transceiver 82); and the device communications processor 16 that exchanges image data or attribute information about image data through use of the device interface circuit, in accordance with any one of a plurality of USB classes corresponding to the type of the digital equipment connected to the device interface circuit or an application.

In such a configuration, the digital camera device 1 can work in conjunction with a larger number of pieces of digital equipment which can be physically connected to the digital camera device by a cable. Therefore, there can be diminished occurrence of a problem for the user, such as a problem of difficulty being encountered when a digital camera device fails to utilize digital equipment though the digital equipment can be physically connected to the digital equipment by way of a USB cable.

In this embodiment, the device communications processor 16 has a first interface descriptor (i.e., the SIC interface descriptor 43*a*) for use with a first USB class (SIC), the descriptor being connected to the direct printing printer 101 and used for direct printing operation, and a second interface descriptor (the MSC interface descriptor 43*b*) for use in the second USB class (e.g., MSC), the descriptor being connected to terminal equipment, such as the personal computer 103, and employed when the digital camera device 1 is used as an external storage of the terminal equipment.

When digital equipment is connected to the digital camera device 1, the first and second interface descriptors are transmitted to the digital equipment. Subsequently, in accordance with a command from the digital equipment, the device communications processor 16 selects at least one from the first and second USB classes as a USB class to be used for communication.

In such a configuration, the digital camera device 1 can work in conjunction with digital equipment even when any one of the direct printing printer 101 and the personal computer 103, which totally differ from each other, is connected to the digital camera device 1.

In this embodiment, the device communications processor 16 has the SIC interface descriptor 43*a* and the MSC interface descriptor 43*b*. When digital equipment is connected to the digital camera device 1, the two interface descriptors 43*a*, 43*b* are transmitted to the digital equipment. In accordance with a command from the digital equipment, at least one is selected as a USB class to be used for communication from the SIC and the MSC.

In such a configuration, if the digital equipment to be connected corresponds to at least one of the SIC and the MSC, the digital camera device 1 can work in conjunction with the digital equipment. Further, if the digital equipment to be connected corresponds to the SIC and the MSC, the USB class selected by the digital equipment can be used, and the digital camera device 1 can work in conjunction with a larger number of applications of the digital equipment.

In this embodiment, the device communications processor 16 has the SIC interface descriptor 43*a* and the MSC interface descriptor 43*b*. When a printer capable of using the SIC and the MSC is connected to the digital camera device 1, the two interface descriptors 43*a*, 43*b* are transmitted to the printer. In accordance with the USB class selected by the printer, image data to be used for direct printing can also be transmitted to the printer. In such a case, the USB class selected by the printer serving as digital equipment can be used, and the digital camera device can work in conjunction with a larger number of print applications of the printer.

A digital camera device 1 acting as a data input device according to a second embodiment of the invention establishes communication and exchanges image data with digital equipment to be connected, by modifying the device communications processor 16 and using a vendor-extended USB class, as required.

FIG. 13 is a view hierarchically showing a processor to be implemented by the device communications processor 16 in the digital camera device 1 serving as the data input device of the second embodiment. In addition to including the processor to be provided in the case of the first embodiment, the device communications processor 16 is equipped with a vendor-extended MSC processing layer 131 which performs communication through use of the host/device switcher 18 at a MSC extended for direct printing unique to a vendor; a file system 132 for managing, as a file, the data recorded in the recording medium 14 at a level higher than the vendor-extended MSC processing layer 131; and a direct print control layer 133 which implements direct printing operation through use of the vendor-extended MSC processing layer 131. The file system 132 may also double as the file system 25.

Specifically, when the printer connected to the digital camera device 1 is compatible with direct printing unique to the vendor using the extended MSC, the device communications processor 16 uses the vendor-extended MSC processing layer 131, the file system 132, and the direct print control layer 133 for communication with the digital equipment and processing a command from the digital equipment.

Figure 14:
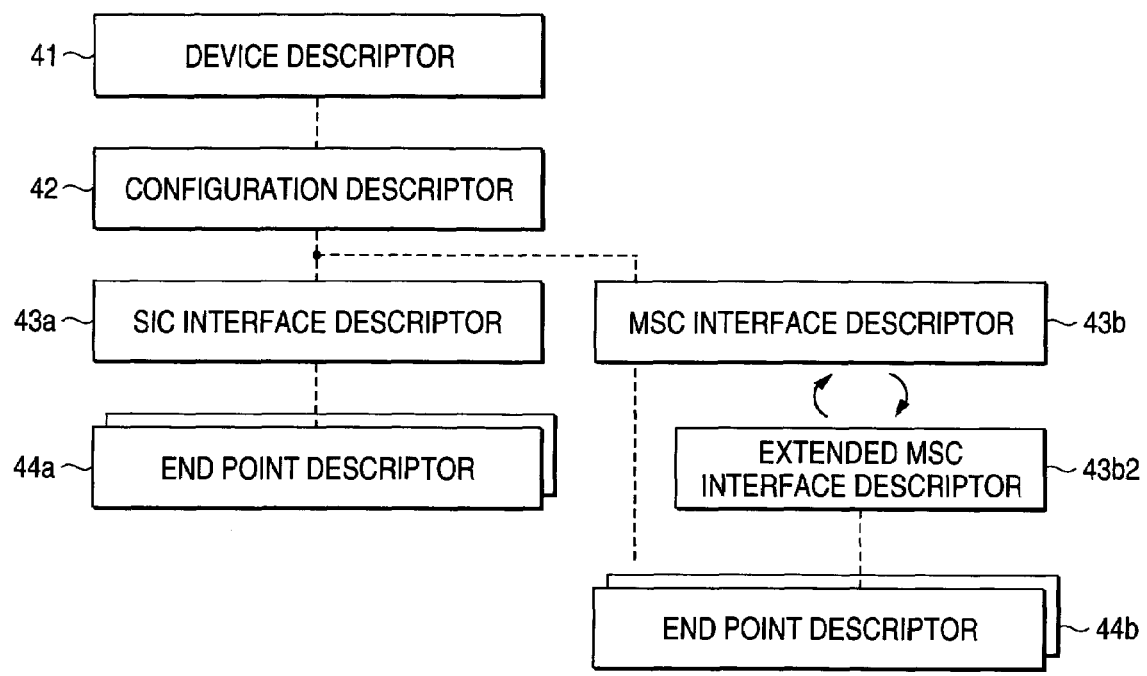
FIG. 14 is a view showing a plurality of channels of descriptors provided for use in device processing of the digital camera device of FIG. 13.

As in the case of the first embodiment, the digital camera device 1 is a composite device equipped with a plurality of USB classes. Therefore, the digital camera device 1 is equipped with a plurality of channels of descriptors as shown in FIG. 14.

The digital camera device 1 has standard descriptors analogous to those of the first embodiment shown in FIG. 4. The digital camera device 1 of the second embodiment has an extended MSC interface descriptor 43$b$2 for use with of the vendor-extended MSC. The extended MSC interface descriptor 43$b$2 is used as a substitute for the MSC interface descriptor 43$b$. The MSC end-point descriptor 44$b$ is utilized, in unmodified form, as an end-point descriptor corresponding to an interface for the extended MSC.

In other respects, the digital camera device 1 of the second embodiment is identical in configuration with that of the first embodiment, and hence repetitive explanation thereof is omitted.

Next, operation of the digital camera device will be described.

When digital equipment which is to act as a USB host is connected to the digital camera device 1, the device communications processor 16 selects a USB descriptor appropriate for the connected digital equipment. The device communications processor 16 transmits the descriptor in accordance with a request from the connected digital equipment.

At that time, the controller 15 has previously set standard descriptors (i.e., all the descriptors exclusive of the extended MSC interface descriptor 43$b$2 shown in FIG. 14) as descriptors of USB class corresponding to respective types of pieces of digital equipment that can be connected to the digital camera device 1. Subsequently, the device communications processor 16 transmits the descriptors to the connected digital equipment. Along with the descriptors, the device communications processor 16 also sends, to the connected digital equipment, a report stating that the digital camera device 1 can carry out direct print service based on a specified vendor-extended MSC. This reporting operation is performed by transmitting a substitute descriptor (i.e., in the present embodiment, the extended MSC interface descriptor 43$b$2).

When the connected digital equipment is a printer which can perform direct print service based on the specific vendor-extended MSC, a command for switching the MSC to the vendor-extended MSC is supplied to the digital camera device 1. Upon receipt of the command, the digital camera device 1 modifies the USB class used for communication with the digital equipment to the vendor-extended MSC. In addition, the interface descriptor 43$b$2 for extended MSC is transmitted to the printer, and direct printing operation is performed at a higher level by the direct print control layer 133.

In a case where the connected digital equipment cannot perform the direct print service based on the specific vendor-extended MSC, the digital equipment selects a USB class and reports the thus-selected USB class to the digital camera device 1, as has been described in connection with the first embodiment.

In other respects, the operation of the digital camera device 1 of the second embodiment is identical with that of the digital camera device 1 of the first embodiment, and hence repetitive explanation is omitted.

In this embodiment, the device communications processor 16 has the interface descriptor 43$b$ for use with a MSC and the interface descriptor 43$b$2 for use with a vendor-extended MSC. When digital equipment is connected to the digital camera device 1, information about the vendor-extended USB class is transmitted to the digital equipment. Upon receipt of an instruction for switching, from the digital equipment, the MSC to the vendor-extended MSC, the device communications processor 16 switches the interface to be used to the interface for use with a vendor-extended MSC.

As a result, when the digital equipment to be connected can use a specific vendor-extended USB class, the digital camera device 1 can work in conjunction with the digital equipment by utilizing the specific extended USB class.

When serving as a USB host, a digital camera device 1, which is a data input device according to a third embodiment of the invention, exchanges a data file with a data file storage (e.g., a hard disk drive, semiconductor memory, or the like) of the connected digital equipment, instead of transmitting a print control command to the PC printer 102 as does the digital camera device 1 of the first embodiment. For instance, a memory card reader/writer which enables removable attachment of a memory card is mentioned as such equipment.

In the digital camera device 1 of the third embodiment, the host communications processor 17 exchanges a data file with the data file storage of the connected digital equipment, by a USB mass storage class, for example.

In other respects, the digital camera device 1 of the third embodiment is identical in configuration and operation with the digital camera device 1 of the first embodiment, and hence repetitive explanations thereof are omitted.

When serving as a USB host, a digital camera device 1, which is a data input device according to a fourth embodiment of the invention, is arranged to transmit a print control command to the PC printer 102 as does the digital camera device 1 of the first embodiment, or to exchange a data file with a data file storage (e.g., a hard disk drive, semiconductor memory, or the like) of the connected digital equipment as does the digital camera device 1 of the third embodiment, in accordance with the type of digital equipment to be connected or an application of the equipment.

Figure 5:
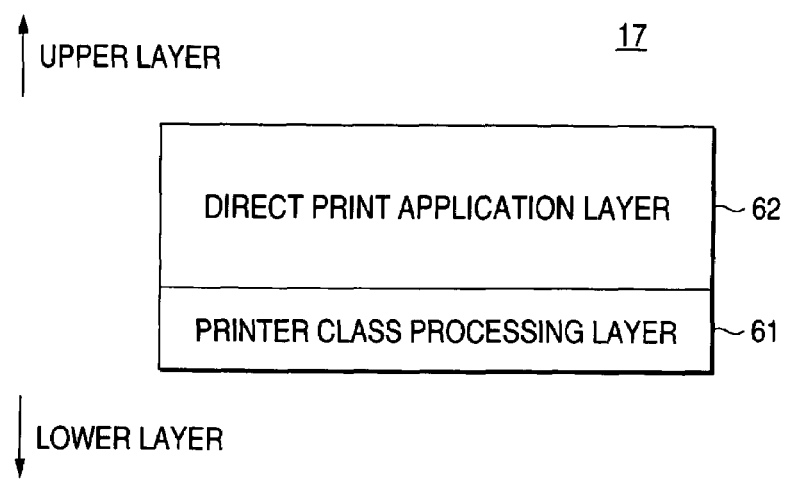
FIG. 5 is a view hierarchically showing a host communications processor in the digital camera device of FIG. 1.

In the digital camera device 1 of the fourth embodiment, in addition to including the printer class layer 61 for performing communication processing in accordance with the USB printer class shown in FIG. 5 and the direct print application layer 62 at a level higher than the printer class layer, the host communications processor 17 has a MSC layer for performing communication processing in accordance with an unillustrated USB mass storage class and a file system at a level higher than the MSC layer. The MSC layer and the file system remaining at a level higher than the MSC layer exchange a data file with a data file storage section of the connected digital equipment.

In response to the type of the digital equipment connected to the host/device switcher 18 having the host interface circuit or an application of the digital equipment, the host communications processor 17 selects any one from the plurality of USB classes (e.g., the printer class and the MSC), thereby exchanging data. At that time, the host communications processor 17 transmits a descriptor transmission request to the connected digital equipment, acquire descriptors of the equipment as a response, and in accordance with the descriptors selects a USB class used for communication with the equipment.

In other respects, the digital camera device 1 of the fourth embodiment is identical in configuration and operation with the digital camera device 1 of the first or third embodiment, and hence repetitive explanations thereof are omitted.

The previously-described embodiments are preferred embodiments of the invention. However, the present invention is not limited to these embodiments and is susceptible to various modifications and alterations within the scope of the invention.

For instance, in the respective embodiments the USB is used as an interface. However, there may also be employed another interface using interface standards, wherein the standards impart different roles to a first interface circuit of two pieces of interconnected equipment and a second interface circuit of the other piece of interconnected equipment.

The types of USB classes, the number thereof, and the sequence of interfaces, all being employed in the respective embodiments, are illustrative, and the digital camera device 1 may use another existing USB class according to digital equipment to be connected. Moreover, still another USB class may be additionally provided.

In the respective embodiments, the data input device of the invention is embodied as the digital camera device 1. However, the embodiment of the data input device is not limited to a digital camera device and can be realized as digital equipment incorporating a recording medium for storing data files, or as digital equipment which enables removable attachment of such a recording medium. Conceivable forms of such digital equipment include a portable cellular phone, a digital music player, or a compact computer such as a PDA.

Further, the data file to be stored in the recording medium of the data input device is not limited to an image data file and may be a music data file of an MP3 format (MPEG1-AudioLayer3) or a motion picture data file of an MPEG2 or 4 format. In a case where such a data file is stored in the recording medium, the data file can be transferred from the data input device 1 to the digital equipment in the same manner as in the case of transfer of the image data file when the digital equipment that outputs an image, music, or a motion picture on the basis of the data file is connected to the data input device.

In the respective embodiments, the digital equipment that can be connected with the data input device is implemented as the direct printing printer 101, the PC printer 102, the personal computer 103, the PDA 104, and the printer 105. However, the digital equipment is not limited to these pieces of equipment. The digital equipment may also be implemented as a projection apparatus such as a projector; a display device such as a display; or a music player for playing back music from a music data file.

In the respective embodiments, the print control command supplied to the printer is a kind of image output control command. When equipment, which outputs an image in a format different from that of the printer, is connected to the data input device, image output commands of a command set compatible with the equipment are supplied to the equipment.

What is claimed is:

1. A data processing method, comprising:
providing a first device adapted to be connected to a second device, and comprising a communicator having a first interface function defined in an asymmetric interface standard and operable to communicate at least one of a data file and a control command which causes the second device to print an image based on image data, with the second device having a second interface function defined in the asymmetric interface standard;
connecting selectively either a personal computer or a printer operable to perform printing without aid of a personal computer to a single connection port of the first device, as the second device;
judging whether the second device connected to the connection port is either the personal computer or the printer;
causing the communicator to transmit, to the second device, an image data file containing image data and a control signal causing the second device to print an image based on the image data, in a case where it is judged that the printer is connected to the connection port; and
causing the communicator to communicate a data file with the second device in a case where it is judged that the personal computer is connected to the connection port.

2. The data processing method as set forth in claim 1, wherein:
the first interface function is a device-side interface function of a USB, and the second interface function is a host-side interface function of the USB.

3. A data processing method, comprising:
providing a first device adapted to be connected to a second device, and comprising a communicator having a first interface function defined in an asymmetric interface standard and operable to perform communications with the second device having a second interface function defined in the asymmetric interface standard, the communicator comprising;
a first processing layer operable to perform communication through a still image capture device class;
a second processing layer operable in accordance with a picture transfer protocol; and
a third processing layer operable in accordance with a direct printing protocol to perform printing without aid of a personal computer;
connecting the second device to the first device;
confirming, with the picture transfer protocol, whether the direct printing protocol is available between the first device and the second device; and
transmitting, to the second device, an image data file containing image data and described with an extensible markup language, and a control signal causing the second device to print an image based on the image data, after it is confirmed that the direct printing protocol is available between the first device and the second device.

4. The data processing method as set forth in claim 3, wherein:
the first interface function is a device-side interface function of a USB, and the second interface function is a host-side interface function of the USB.

5. A first device, adapted to be connected to a second device by way of an asymmetric interface standard, comprising:
a single connection port, to which either a personal computer or a printer operable to perform printing without aid of a personal computer is selectively connected as the second device;
a storage, operable to store at least one data file including an image data file which contains image data;
a communicator, having a first interface function defined in the asymmetric interface standard and operable to communicate at least one of the data file and a control command which causes the second device to print an image based on the image data, with the second device having a second interface function defined in the asymmetric interface standard; and
a controller, operable to judge which one of the personal computer and the printer is connected to the connection port, the controller operable to cause the communicator to transmit the image data file and a control signal to the second device in a case where it is judged that the printer is connected to the connection port, and operable to cause the communicator to communicate the data file with the second device in a case where it is judged that the personal computer is connected to the connection port.

6. The first device as set forth in claim 5, wherein:
the first interface function is a device-side interface function of a USB, and the second interface function is a host-side interface function of the USB.

7. A first device, adapted to be connected to a second device by way of an asymmetric interface standard, comprising:
a storage, operable to store at least one data file including an image data file which contains image data and is described with an extended markup language;
a communicator, having a first interface function defined in the asymmetric interface standard and operable to communicate at least one of the data file and a control command which causes the second device to print an image based on the image data, with the second device having a second interface function defined in the asymmetric interface standard, the communicator comprising:
a first processing layer operable to perform communication through a still image capture device class;
a second processing layer operable in accordance with a picture transfer protocol; and
a third processing layer operable in accordance with a direct printing protocol to perform printing without aid of a personal computer; and
a controller, operable to perform confirmation, with the picture transfer protocol, whether the direct printing protocol is available between the first device and the second device, and operable to cause the communicator to transmit the image data file and a control signal to the second device, after it is confirmed that the direct printing protocol is available between the first device and the second device.

8. The first device as set forth in claim 7, wherein:
the first interface function is a device-side interface function of a USB, and the second interface function is a host-side interface function of the USB.

9. A data processing system, comprising:
a first device and a second device, connected with each other by way of an asymmetric interface standard, wherein the first device comprises:
a single connection port, to which either a personal computer or a printer operable to perform printing without aid of a personal computer is selectively connected as the second device;
a storage, operable to store at least one data file including an image data file which contains image data;
a communicator, having a first interface function defined in the asymmetric interface standard and operable to communicate at least one of the data file and a control command which causes the second device to print an image based on the image data, with the second device having a second interface function defined in the asymmetric interface standard; and
a controller, operable to judge which one of the personal computer and the printer is connected to the connection port, the controller operable to cause the communicator to transmit the image data file and a control signal to the second device in a case where it is judged that the printer is connected to the connection port, and operable to cause the communicator to communicate the data file with the second device in a case where it is judged that the personal computer is connected to the connection port.

10. A data processing system, comprising:
a first device and a second device, connected with each other by way of an asymmetric interface standard, wherein the first device comprises:
a storage, operable to store at least one data file including an image data file which contains image data and is described with an extended markup language;
a communicator, having a first interface function defined in the asymmetric interface standard and operable to communicate at least one of the data file and a control command which causes the second device to print an image based on the image data, with the second device having a second interface function defined in the asymmetric interface standard, the communicator comprising:
a first processing layer operable to perform communication through a still image capture device class;
a second processing layer operable in accordance with a picture transfer protocol; and
a third processing layer operable in accordance with a direct printing protocol to perform printing without aid of a personal computer; and
a controller, operable to perform confirmation, with the picture transfer protocol, whether the direct printing protocol is available between the first device and the second device, and operable to cause the communicator to transmit the image data file and a control signal to the second device, after it is confirmed that the direct printing protocol is available between the first device and the second device.

* * * * *